Aug. 3, 1926.
A. F. CALLISON
1,594,494
TURNTABLE RAMP
Filed Oct. 12, 1925
2 Sheets-Sheet 1
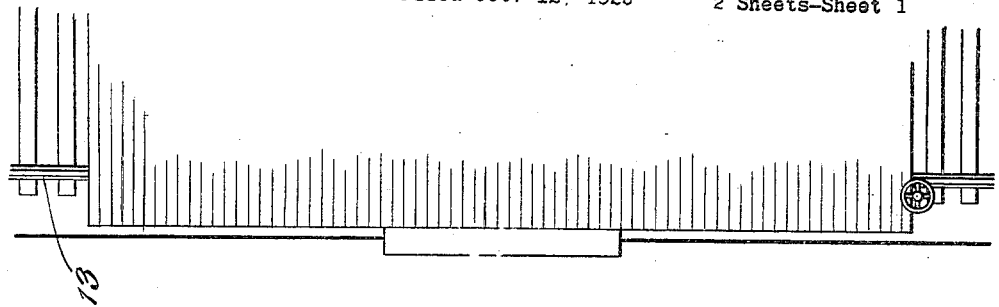
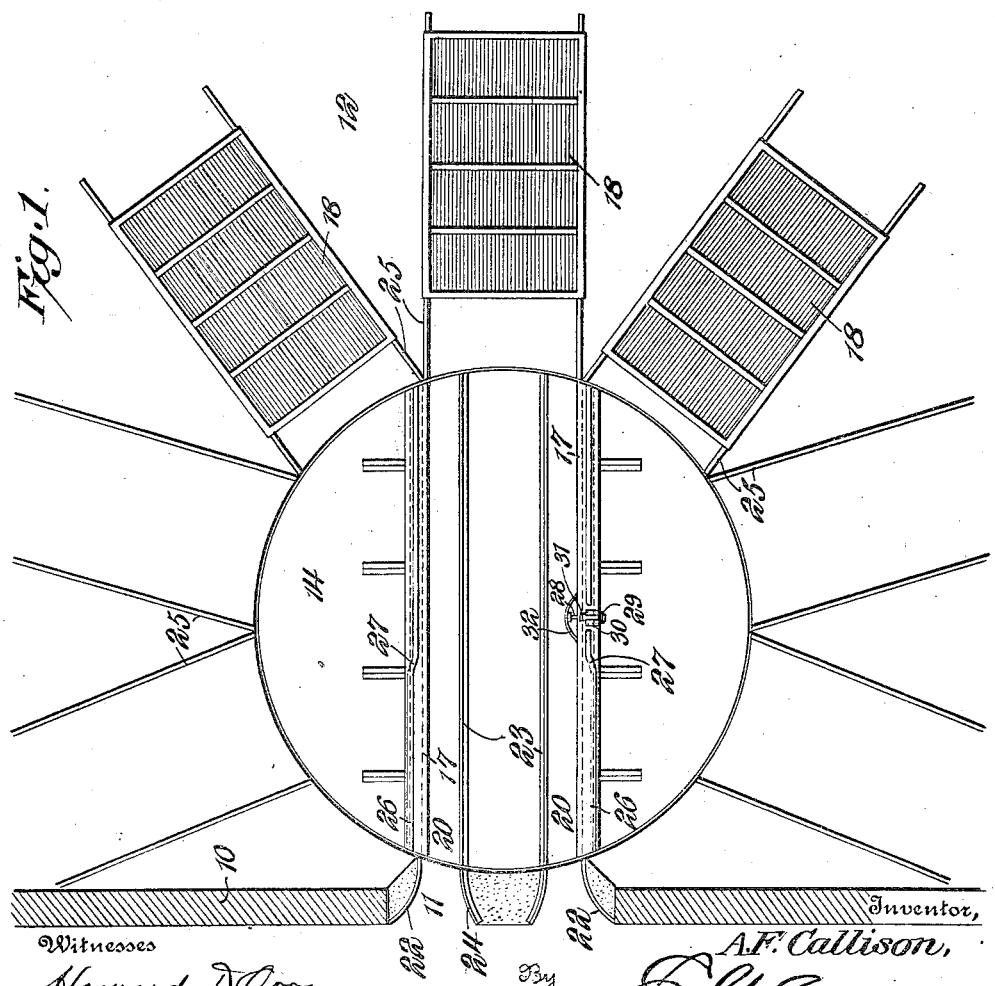
Witnesses
Howard D. Orr.
E. N. Lovewell
Inventor,
A. F. Callison,
By
Attorney

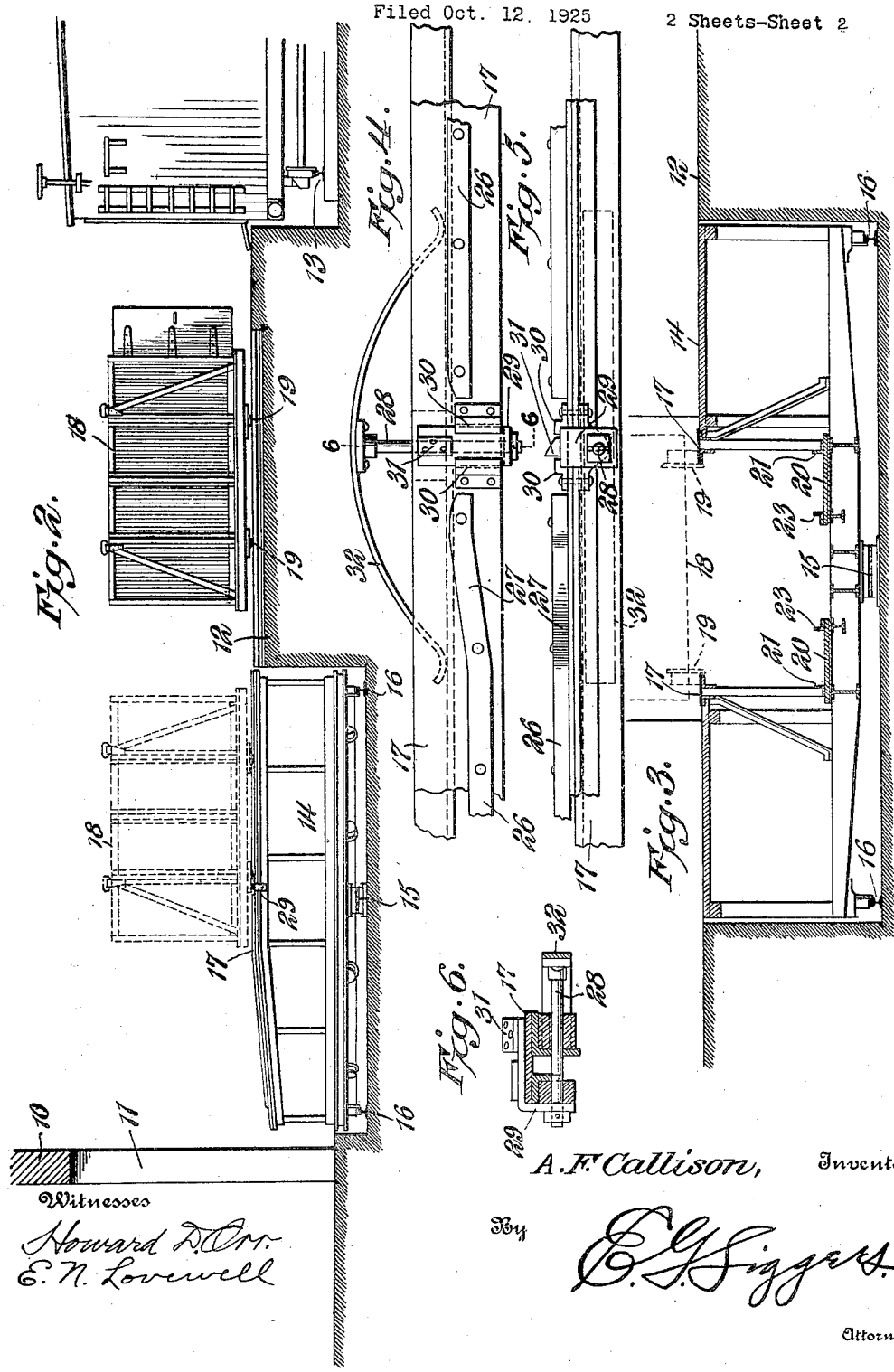

Patented Aug. 3, 1926.

1,594,494

UNITED STATES PATENT OFFICE.

ABNER F. CALLISON, OF NEW YORK, N. Y.

TURNTABLE RAMP.

Application filed October 12, 1925. Serial No. 62,036.

This invention relates to a turntable ramp, especially adapted to be used in connection with a freight or warehouse platform for transferring comparatively large wheeled freight containers to or from a motor truck, or other carrier. These containers are of suitable shape and size to fit the truck, and one or several of them constitute a full truck load.
The object of the invention is to provide means for handling containers of this type, in which a ramp track is used for loading or unloading the container, in combination with a turntable, by the operation of which the container may be received from, or delivered to any portion of the platform. Improved means are also provided for centering the truck and the container between the ramp tracks, and for preventing the container from rolling off of the outer end of the ramp tracks, except when the truck is in position to receive it.

The specific construction of the invention and its advantages will be more particularly explained in connection with the accompanying drawings, which illustrate in detail one embodiment thereof.

In the drawings:—

Figure 1 is a plan view of the invention.
Figure 2 is a side elevation thereof with the platform and the wall of the building shown in section.

Figure 3 is a vertical sectional view.

Figure 4 is a plan view, on an enlarged scale, of means for controlling the position of the container.

Figure 5 is a side elevation of the parts shown in Figure 4.

Figure 6 is a section taken substantially on the line 6—6 of Figure 4.

The invention is shown as installed in a freight depot or warehouse, the wall of which is shown at 10, and is provided with an opening or doorway 11 through which the truck may be backed. The building is provided with a raised floor 12, and is conveniently located with respect to some medium of long distance transportation as, for example, a railroad track 13.
Just inside the doorway 11 is a turntable 14, whose upper surface is substantially flush with the surface of the platform 12 and contiguous thereto. The turntable is of rigid construction, and is supported on a suitable central bearing 15 and a circular track 16. Secured to the turntable 14 are suitable ramp tracks 17, with sufficient space between them to receive the truck. The containers 18 are comparatively large, and are provided with wheels 19 adapted to ride on the ramp tracks 17, so that the containers will be lifted from the truck as the latter is backed into the space between the ramp tracks.

Runways 20 are secured to the turntable between the ramp tracks 17, and when the turntable is rotated to the position shown in Figure 1, these runways are adapted to receive the wheels of the truck as the latter is backed through the doorway 11. Guide bars 21 are located at the outer sides of the runways 20, and are adapted to register with converging steel-covered abutments 22 which are adapted to be engaged by the wheels of a comparatively wide truck, and to center the same between the ramps as the truck is backed. Similar guide bars 23 are located at the inner sides of the tracks 20, and are adapted to register with a steel-covered abutment 24 which will engage and center the wheels of a narrower truck.

When a container has been transferred to the ramp tracks, the truck may be withdrawn from the turntable, and the latter may be turned by any suitable means so that the container 18 may be rolled from the turntable in any direction, or to any portion of the platform. An inbound container may thus be delivered to one side of the platform, and the turntable 14 may then be turned to such a position that an outbound container may be transferred to the ramp tracks from the opposite side of the platform. The turntable may then be turned again to a position for receiving the truck, so that the outbound container may be loaded thereon. The mechanism for transferring the container to and from the truck forms no part of the present invention, and need not be described herein.

For convenience in guiding the containers to and from different portions of the platform, I have shown a number of tracks 25 radiating from the edge of the turntable, but these tracks may be omitted if desired.

The ramp tracks 17 have guide strips 26 secured thereto, and so arranged as to receive the wheels 19 of the containers between them as the containers are transferred from the truck to the ramp tracks. These guide strips 26 are formed with inwardly converging portions 27, which accurately center the containers as they reach the horizontal portions of the ramp tracks. A horizontal plunger rod 28 is disposed transversely beneath one of the ramp tracks 17, and has a limited reciprocatory movement. An angle bracket 29 is secured to the outer end of the rod 28, so as to normally overhang the track 17. This overhanging portion of the angle bracket is guided between cleats 30, and a chock 31 is secured to its upper face. A bow spring 32 is secured to the inner end of the plunger rod 28, and normally holds the rod in its innermost position with the chock 31 in the path of the container wheels 19. As the truck is backed into the turntable, the side of the truck engages the bow spring 32 and forces the plunger rod 28 and the chock 31 outwardly, so that the chock is removed from the path of the container wheels 19, and the container is, therefore, free to move along the ramp tracks with the truck. Whenever the container, however, has been left on the turntable and the truck withdrawn therefrom, the chock 31 is automatically restored to its normal position, as shown in Figures 4 and 6, and prevents the container from being accidentally rolled outwardly onto the inclined portions of the ramp tracks.

From the foregoing description, it will be noted that the invention retains all the advantages of the ramp track in transferring the containers to and from the truck, while by using the turntable both inbound and outbound containers may be handled with facility and without confusion, and only one ramp is needed. The containers, as well as the trucks are automatically guided and centered, and the automatic chock prevents the container from accidentally escaping from the tracks.

While I have shown and described in detail one embodiment of the invention, it is apparent that various modifications may be made therein without any material departure from the salient features of the invention. It is my purpose, therefore, to include all such modifications within the scope of what is claimed.

What is claimed is:—

1. The combination with a platform, of a turntable contiguous thereto, and having ramp tracks mounted thereon with horizontal portions substantially flush with the surface of the platform, said turntable being constructed with an open space between said ramp tracks and below the surface of the platform for receiving a vehicle to be loaded or unloaded.

2. A device for handling freight containers and the like, comprising a turntable having ramp tracks secured thereto, and runways between and below the surface of said tracks for receiving the wheels of a vehicle which is to be loaded or unloaded.

3. A device for transferring wheeled containers to or from a truck, comprising a turntable having ramp tracks secured thereto and spaced to receive the truck between them, means for guiding the wheels of the truck to center the latter as it is backed between the tracks, and means for guiding and centering the container as it is transferred to the ramp.

4. A device for handling wheeled freight containers and the like, comprising a turntable having ramp tracks secured thereto and spaced to receive a truck between them to be loaded or unloaded, runways on the turntable having side flanges for receiving the wheels of the truck between them, and converging fixed entrance abutments adapted to register with said side flanges for guiding the wheels of the truck therebetween when the turntable is in a position to receive the truck.

5. A device for transferring wheeled containers to or from a truck, comprising ramp tracks for receiving the wheels of the container, runways between and below the surface of the ramp tracks for receiving the wheels of the truck, a chock normally in the path of one of the container wheels, and means engageable by the truck when the latter is between the ramp tracks to hold said chock in inoperative position.

6. A device for transferring wheeled containers to or from a truck, comprising ramp tracks for receiving the wheels of the container and constructed with a space between them for receiving the truck, a chock movable transversely across one of the ramp tracks, a spring normally holding the chock in the path of the container wheel, and means engaged by the truck when the latter is between the ramp tracks to hold the chock in inoperative position against the resistance of said spring.

7. A device for handling wheeled freight containers and the like, comprising a turntable having ramp tracks secured thereto, runways between and below said tracks for receiving the wheels of a truck which is to be loaded or unloaded, a chock supported for rectilinear movement transversely across one of the ramp tracks, a spring normally holding the chock in the path of the container wheel, and means engageable by the truck when the latter is driven between the ramp tracks to move the chock against the resistance of the spring and out of the path of said wheel.

8. A device for handling wheeled freight containers and the like, comprising a turntable having ramp tracks secured thereto and arranged with a space between them for receiving a truck which is to be loaded or unloaded, means for guiding the wheels of the truck to center the latter as it is backed between the tracks, means for guiding and centering the container as it is transferred to the ramp, a chock normally in the path of one of the container wheels, and means engageable by the truck when the latter is moved between the ramp tracks to retract said chock out of the path of said container wheel.

9. A device for handling wheeled freight containers and the like, comprising a turntable having ramp tracks secured thereto and arranged to receive between them a truck which is to be loaded or unloaded, runways on the turntable having side flanges for receiving the wheels of the truck between them, converging fixed entrance abutments adapted to register with said side flanges for guiding the wheels of the truck therebetween when the turntable is in position to receive the truck, a chock movable transversely across one of the ramp tracks, a spring normally holding the chock in the path of the container wheel, and means engageable by the truck when the latter is backed between the ramp tracks to move the chock against the resistance of the spring and out of the path of said container wheel.

10. A device for transferring wheeled containers to or from a truck, comprising ramp tracks for receiving the wheels of the container and constructed with a space between them into which the truck may be driven, means normally preventing a container located on said tracks from rolling off of the outer ends of the tracks, and means engaged by the truck when the latter is between said tracks to hold said first-mentioned means in inoperative position.

11. A device for transferring wheeled containers to or from a truck, comprising ramp tracks for receiving the wheels of the container and constructed with a space between them into which the truck may be driven, a plunger mounted for transverse rectilinear movement beneath one of said tracks, a bracket secured to one end of the plunger and overhanging the same, a chock secured to the bracket above the level of the track, and a bow spring associated with the other end of the plunger and bearing against the side of the track to hold said chock normally in the path of the container wheel, said bow spring being engaged by the truck when the latter is between the tracks to hold said chock out of the path of the container wheel.

In testimony, that I claim the foregoing as my own, I have hereto affixed my signature.

ABNER F. CALLISON.